3,465,582
BOREHOLE LOGGING SYSTEM
Albert P. Richter, Jr., and James D. Bruner, Houston, Tex., assignors to Texaco Inc., New York, N.Y., a corporation of Delaware
Filed Dec. 14, 1967, Ser. No. 690,581
Int. Cl. E21b 49/00
U.S. Cl. 73—152     1 Claim

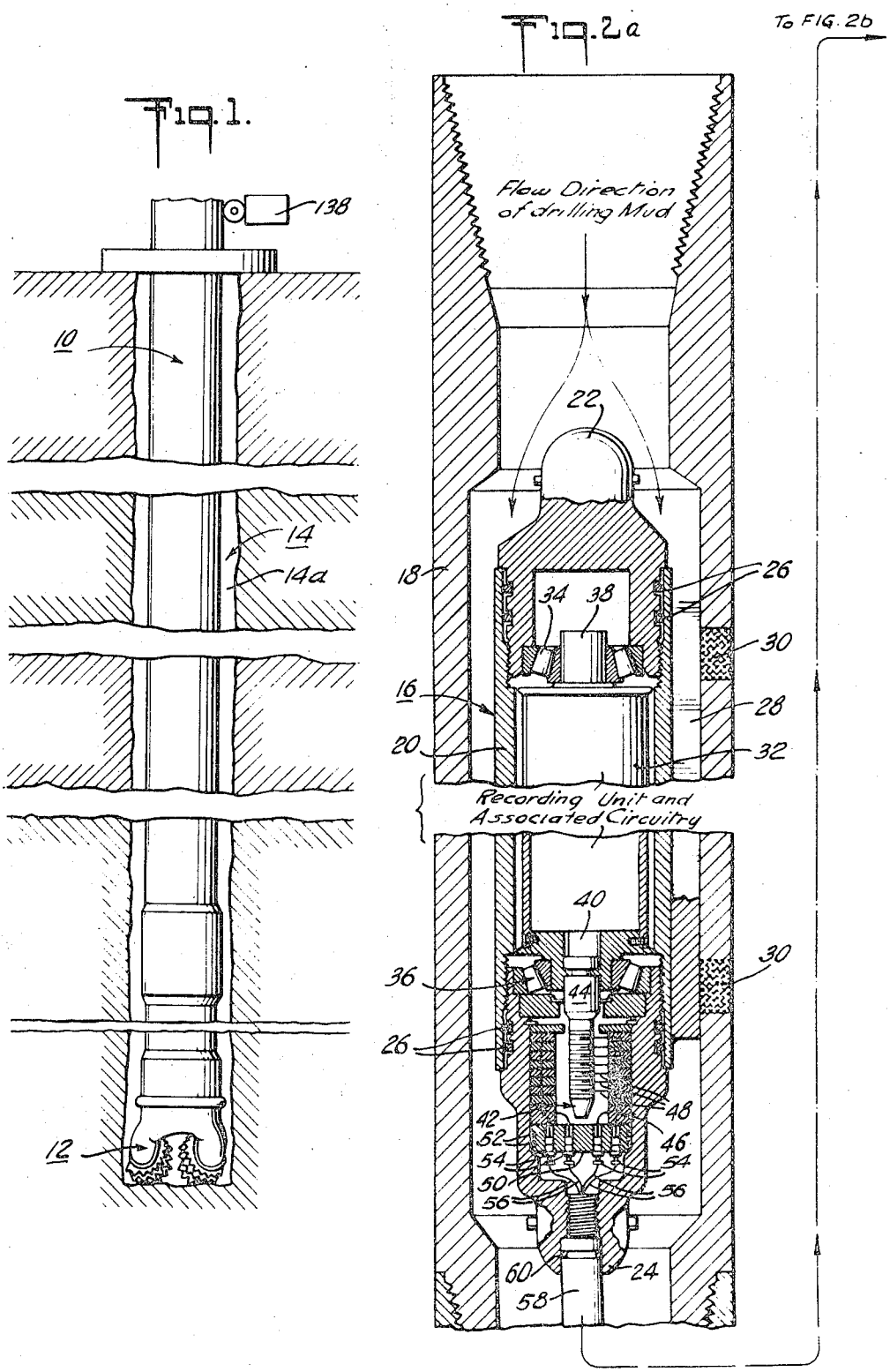

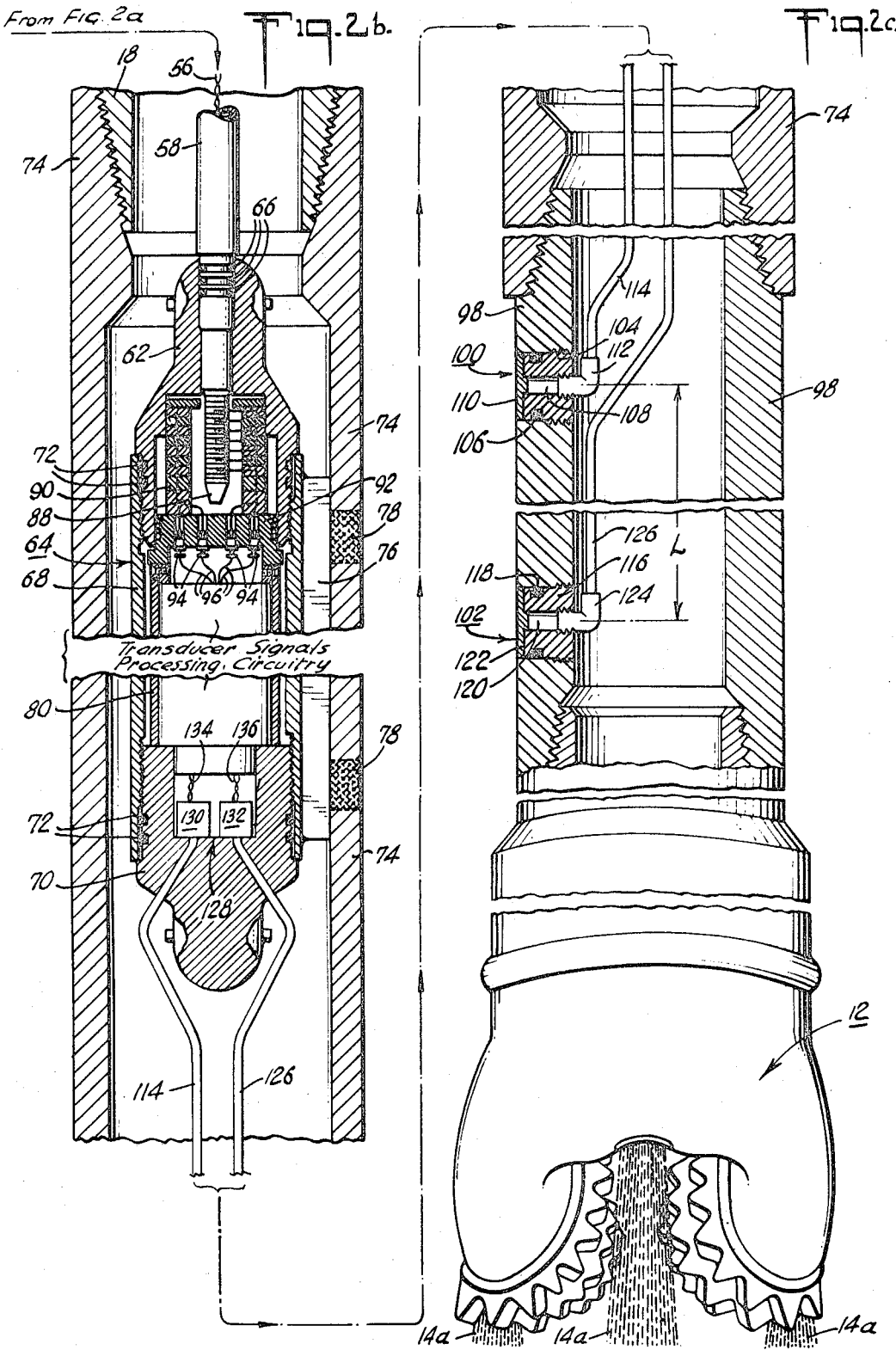

ABSTRACT OF THE DISCLOSURE

In order to detect gas bearing earth formations traversed by an earth borehole containing drilling fluid, or drilling mud, there is incorporated in a drill string above a drill bit two pressure sensing devices which are vertically spaced apart. Being in contact with the drilling mud at different depths in the borehole, the pressure sensing devices are capable of measuring the pressure or the weight of the drilling mud at the aforesaid different depths in the borehole. In the event that an adjacent gas bearing earth formation is present, the presence of gas in the drilling mud would reduce the density of the drilling mud by a significant amount. Thus the variation of drilling mud pressure or drilling mud weight detected by the pressure sensing devices would indicate the presence of hydrocarbon bearing formations. In addition, during the drilling of the earth borehole such detection and measurement would provide an early warning of "hole trouble" stemming from excessive gas flow.

BACKGROUND OF THE INVENTION

The invention, hereinafter described and illustrated in the accompanying drawing figures, pertains, generally, to logging various parameters determined in a borehole traversing various earth formations and more particularly: (1) to the detection of gas bearing earth formations traversed by the borehole; and (2) the provision of an early warning of "hole trouble" stemming from excessive gas flow from earth formations. In accordance with one aspect of the invention, the aforementioned detection of gas bearing formations and/or early warning indications of "hole trouble" may be provided simultaneously with the drilling of the borehole in the earth.

One of the earth formations of particular interest during the drilling of an earth borehole in search of subsurface hydrocarbons is the formations which contain gas, or gas bearing formations as they are often called. Several logs are presently available to aid in the location of such formations. However, it would be highly desirable in many instances to obtain information relative to the location of these formations while the drilling operation is in progress. This would be especially true in such cases where the passage of time tends to alter the log characteristics. The location of gas bearing formations is particularly desirable in that hydrocarbon bearing formations are relatively easily detectable as a result of the detection of gas bearing formations.

The location of gas bearing formations during the drilling of an earth borehole is especially desirable for another reason: early detection of a gas bearing formation would enable an early warning or alert as to the possibility of "hole trouble" stemming from excessive gas flow.

SUMMARY OF THE INVENTION

One object of the invention is to determine the presence of gas bearing formations in the subsurface of the earth.

Another object of the invention is to determine the presence of gas-bearing formations traversed by a borehole in the earth.

Another object of the invention is to detect the presence of gas-bearing formations traversed by an earth borehole while the drilling of the earth borehole is in progress.

Another object of the invention is to provide an early warning or alert as to the possibility of "hole trouble" stemming from excessive gas flow from gas-bearing formations in the subsurface of the earth.

Still another object of the invention is to provide an early warning of "hole trouble" stemming from excessive gas flow from gas-bearing formations into a drilling fluid in an earth borehole traversing the various earth formations.

In accordance with an illustrative embodiment of the invention there is incorporated in a drill string two pressure sensing devices which are vertically spaced apart and in contact with the drilling fluid, or drilling mud, at different depths in the borehole. The pressure sensing devices are effective to provide a measure of the weight of the drilling mud at the various depths in the borehole. Transducers associated with the pressure sensing devices convert the pressure energy to electrical energy or electrical signals representative of the pressure or weight of the drilling mud detected and the electrical signals are processed through a transducer signal processing network; said signals being ultimately recorded in a recording unit in situ in the drill string during the drilling operation. Inasmuch as the presence of gas in the drilling mud reduces the density of the drilling mud by a significant amount, the pressures or forces sensed by the pressure sensing devices give an indication of the presence of gas flow from gas gearing formations in to the drilling mud.

BRIEF DESCRIPTION OF THE DRAWINGS

FIG. 1 is an elevation view showing a rotary drilling apparatus penetrating various earth formations during the drilling of an earth borehole; said apparatus including the logging apparatus in accordance with the present invention.

FIGS. 2a, 2b and 2c are cross-sectional elevation views of different sections of the lower end of the drilling apparatus of FIG. 1 and including the rotary drill bit of the apparatus of FIG. 1; FIG. 2a showing the uppermost section, FIG. 2b the next lower section, and FIG. 2c the lowermost section below FIG. 2b housing pressure sensing devices and associated components.

DESCRIPTION OF THE PREFERRED EMBODIMENTS

Throughout the drawing figures like elements or components are designated by the same reference numbers.

In FIG. 1 there is shown a drill string generally designated by the reference number 10. Drill string 10 is made up of, among other things, a series of drill pipes connected end to end. Located at the lowermost end of drill string 10 is a conventional rotary drill bit generally designated by the reference number 12. As shown in FIG. 1 drill bit 12 has rotatably drilled an earth borehole 14 which traverses various earth formations. Bore hole 14 is filled with drilling fluid 14a, or drilling mud as it is often called.

As shown in FIG. 2a there is provided a sealed capsule designated generally by the reference number 16. Capsule 16 is a sealed container adapted to withstand pressures of about 14,000 lbs. per square inch or more. As illustrated, capsule 16 is mounted coaxially within a special sub 18 which, in the illustration shown, is a drill collar which has been hollowed out for the purpose of receiving the capsule 16. The capsule 16 contains a recording unit and necessary associated circuitry. Capsule 16, hereinafter referred to on occasion as the recorder capsule, is comprised of a tubular member 20 of steel or another suitable high strength material. Tubular member 20 is internally threaded, as shown, near its upper end and near its lower end. The aforementioned internal threads are for the purpose of receiving external threads formed on end caps 22 and 24 respectively, or bull plugs as they are often called. End caps 22 and 24 close the upper and lower ends of tubular member 20 and each end cap 22 and 24 has two annular recesses formed in the outer periphery thereof. These annular recesses contain O-rings 26. O-rings 26 effectively seal the recorder capsule 16 so that the drilling fluid or drilling mud flowing through special sub 18 in the direction indicated by the labeled arrows in FIG. 2a cannot enter the recorder capsule 16 and contaminate or damage the contents thereof. Recorder capsule 16 is mounted within special sub 18 by means of a plurality of spaced apart longitudinal members 28 or runners which are welded to the outside surface of tubular member 20 along substantially the entire length thereof. Runners 28 are also welded to the special sub 18. In order to weld runners 28 to special sub 18 a plurality of holes are machined through the wall of sub 18 and after the recorder capsule 16 with the runners welded thereto has been suitably positioned within the sub 18 welds are made through the sub 18 thereby securing the runners 28 to the wall of the sub 18. The aforesaid welds are designated by the reference numbers 30. Located within tubular member 20 is another tubular container 32 or housing in which there is located a recorder and associated circuitry, among other things. Tubular container 32 housing the recording unit and the associated circuitry is mounted for rotation about its own longitudinal axis by means of two sets of tapered roller bearings 34 and 36 which are located at the upper and lower ends respectively of the container 32. This arrangement is advantageous in that the recording unit and its associated circuitry within container 32 is free to rotate thus avoiding damage occasioned by sudden angular accelerations or decelerations of the rotating drill string and drill bit. The uppermost end of container 32 is provided with an end cap having a cylindrical shaft 38 which is journaled for rotation in the bearing member 34. The lower end of container 32 is also provided with an end cap having a cylindrical shaft 40. Cylindrical shaft 40 is hollow and is adapted to receive the male portion 42 of a slip ring assembly, the male portion 42 having an enlarged cylindrical shaft portion 44 which is similarly journaled for rotation in the bearing member 36. Cylindrical portion 44 is rigidly connected to shaft 40 and shaft 40 in turn is rigidly connected to container 32 so that container 32 may rotate about its longitudinal axis. The male portion 42 of the slip ring assembly is free to rotate in unison with container 32 and shaft 40. The male portion 42 of the slip ring assembly has an internal cavity therewithin carrying wiring which communicates with the container 32 and the recording unit and associated circuitry therein. The slip ring assembly is also comprised of a female slip ring portion 46. Electrical wiring comprising electrical conductors from the static or nonmobile female slip ring portion 46 runs via electrical contacts 48 to the male or moveable slip ring portion 42. Situated immediately below the female slip ring portion 46 is a cylindrical block 50 which houses various electrical terminal members 54. The cylindrical block 50 is provided with a number of annular recesses in the periphery thereof and these recesses contain the sealing O-rings 52. The cylindrical block 50 may be made of steel and the terminal members 54 mounted in the recesses provided therein may be coated with a dielectric material in order to prevent the occurrence of an electrical path between the terminal members 54 and the steel block 50. Electrically connected to the terminal members 54 are a plurality of electrical conductors 56 which, in turn, electrically communicate through terminals 54 with the static or female slip ring portion 46 from whence they are connected to the electrical contacts 48 and ultimately to the male portion 42 of the slip ring assembly. On the outside surface of the male slip ring portion 42 there is provided a plurality of electrically conductive members which ultimately provide electrical communication between the conductors 56 and the associated electronic circuitry and recording unit within container 32. The conductors 56 pass through a conduit 58 and are connected as hereinafter indicated.

As shown in FIG. 2a the bottom end cap 24 has at its lower extremity an internally threaded aperture adapted to receive the externally threaded conduit 58. Conduit 58 has at its connection with end cap 24 an annular groove therein in which there is located another sealing O-ring 60 which serves to prevent the entry of drilling mud into the slip ring assembly and recorder capsule 16. Inasmuch as conduit 58 is externally threaded and the end cap 24 is internally threaded there is thereby provided a rigid nonrotative connection between conduit 58 and recorder capsule 16.

As shown in FIG. 2b conduit 58 enters an end cap 62 of another sealed capsule designated generally by the reference number 64. Capsule 64 is similar to capsule 16, hereinbefore discussed, and as indicated in FIG. 2b is labelled as the transducer signals processing capsule. As labelled, capsule 64 contains transducer signals processing circuitry, among other things. Conduit 58 which enters and communicates with capsule 64 through end cap 62 is not threadably connected to the end cap. Conduit 58 is provided with a plurality of annular recesses in which there is located the sealing O-rings 66. Although conduit 58 is threadably coupled to end cap 24 of the recorder capsule 16 it is coupled in a quick disconnect manner to end cap 62 of the transducer signals processing capsule 64. Advantageously capsule 64 may be quickly disconnected from conduit 58 in order that a different transducer signals processing capsule may be quickly coupled to conduit 58 and electrically coupled to the same recording unit and associated circuitry contained in the container 32. The capsule 64 is comprised of a tubular member 68 which is internally threaded as shown in FIG. 2b at its upper and lower end so as to receive the end cap 62 as well as another end cap 70. End caps 62 and 70 are provided with a plurality of annular recesses which are adapted to receive the sealing O-rings 72. The O-rings 72 perform the same kind of sealing function as the O-rings 26 hereinbefore discussed.

As shown the transducer signals processing capsule 64 is mounted coaxially within a special sub 74 which is similar to special sub 18 hereinbefore described. As indicated, the special subs 18 and 74 are threadably coupled together by means of conventional API tool joints. Tubular member 68 is coaxially mounted within special sub 74 by means of a plurality of welded longitudinal members 76 or runners. In the same manner as runners 28 hereinbefore discussed support tubular member 20 within special sub 18, i.e., tubular member 68 is supported by longitudinal welds running the length of runners 76 along tubular members 68. A plurality of welds 78 which are formed in the same manner as welds 30 are formed in relation to special sub 18 support runners 76 on sub 74. Holes are machined through special sub 74 and then welds 78 are made to the various runners 76 in order to secure the runners to the special subs 74. As labelled in FIG. 2b there is situated within tubular member 68 a tubular container 80 or housing in which there is mounted transducer signals processing circuitry. The signals processed by the aforementioned circuitry are ultimately transmitted to recorder capsule 16. As shown in FIG. 2b there is located at the uppermost end of the capsule 64 in end cap 62 thereof another slip ring assembly comprising a male slip ring portion 88 and a female slip ring portion 90. The male slip ring portion 88 has a hollow interior including among other things wires therein which are received in communication conduit 58 and carried through to recorder capsule 16. Male slip ring portion 88 is, in effect, an extension of conduit 58. The male slip ring portion 88 being fitted to the lowermost end of conduit 58. Located below the female slip ring portion 90 is a header 92 or bulk head in cylindrical form which houses electrical terminals 94. Terminals 94 receive transducer signals from conductors 96 which are electrically connected to terminals 94 and transmit such signals via slip ring portions 90 and 88 to the conductors 56 and ultimately to recorder capsule 16.

The construction and arrangement of the various components comprising the recorder capsule 16 and transducer signals processing capsule 64 are disclosed in U.S. patent application Ser. No. 674,335, filed Oct. 10, 1967, entitled "Logging While Drilling System," in behalf of Albert P. Ritcher, Jr., and James D. Bruner.

Coupled by means of conventional API threaded tool joints to the lowermost end of special sub 74 is another special sub 98 as shown in FIG. 2c. Also coupled to the lowermost end of special sub 98 is the drill bit 12. As shown in FIGS. 2a, 2b and 2c, the drilling fluid or drilling mud 14a passes downwardly through the drill string 10 and the serially coupled special subs 18, 74, 98 and drill bit 12 where it is discharged in the form of jets from drill bit 12 into borehole 14 and thence passes upwardly between the outside surface of the drill string 10 and the wall of borehole 14 to the surface.

As is shown in FIG. 2c the special sub 98 has two apertures provided in the wall thereof. Each aperture receiving a different pressure sensing device 100 and 102, respectively. Pressure sensing devices 100 and 102 are of the piston-diaphragm type. For example, the pressure sensing device is comprised of an externally threaded pressure plug 104 which is threadably received in the internally threaded hole provided in the wall of special sub 98. In addition the pressure plug 104 has an annular recess in the external periphery thereof and this recess receives a sealing O-ring 106. The pressure plug 104 is provided with a central aperture 108. Mounted on pressure plug 104 and in communication with the aperture 108 is a piston-like element 110. The force of the drilling mud against the face of the piston-like element 110 is transmitted to oil in aperture 108 as well as the oil in the hollow fitting plug 104 and in communication with the oil filled aperture 108 is hollow fitting 112. Coupled with fitting 112 is a hollow oil filled conduit 114. Force exerted by the drilling mud against piston element 110 is transmitted to the oil in aperture 108 as well as the oil in the hollow fittting 112 and the oil in conduit 114.

The pressure sensing device 102 is comprised of elements similar to those hereinbefore discussed for the pressure sensing device 100. Pressure sensing device 102 is comprised of a pressure plug 116 which has external threads thereon and is adapted to be received in the internally threaded hole provided in the wall of special sub 98. The outer periphery thereof is provided with an annular recess in which there is located a sealing O-ring 118. Pressure plug 116 is provided with a central oil-filled aperture 120. Mounted in communication with the oil-filled aperture 120 of pressure plug 116 is another piston-like element 122. Piston-like element 122 functions in the same manner as piston-like element 110. Coupled to pressure plug 116 and in communication with the central aperture 120 thereof there is a hollow fitting 124. Coupled with hollow fitting 124 is an oil-filled conduit 126. Force exerted against piston-like element 122 is transmitted through the oil contained in aperture 120, hollow fitting 124 and conduit 126. As indicated in FIGS. 2b and 2c the oil-filled conduits 114 and 126 pass through special subs 98 and 74 and are received at the other ends thereof in apertures provided in end cap 70 which end cap closes the lowermost end of the sealed capsule 64.

As shown in FIG. 2b the end cap 70 is provided with two apertures which sealably receive conduits 114 and 126. Thus, force or pressure originally sensed and transmitted by the piston-like elements 110 and 122 is transmitted through the oil system in conduits 114 and 126 through the apertures in end cap 70 to transducer means mounted within end cap 70. As indicated in FIG. 2b the conduits 114 and 126 are directly coupled to the transducer means designated generally by the reference number 128. Transducer means 128 convert the force signals transmitted by the oil in conduits 114 and 126 to electrical signals. More particularly, the transducer means 128 is comprised of two separate transducer means 130 and 132. Transducers 130 and 132 may, for example, be strain gage devices or piezoelectric crystal devices. The output electrical signals from the transducers 130 and 132 are transmitted via the pairs of electrical conductors 134 and 136 to the transducer signals processing circuitry located within the housing 80. The transducer signals processing circuitry located within housing 80 determines and measures the pressure difference sensed by the pressure sensing devices 100 and 102. These pressure differences are converted to electrical signals by transducers 130 and 132 and these signals are in turn processed via the conductor pairs 134 and 136 to the transducer signals processing circuitry from which the converted and processed signals are transmitted via the conductors 96 ultimately to the recorder capsule 16 wherein the recording unit and associated circuitry therein records the pressure or force differences in correlation with the depth of the drill string 10 in the borehole 14. A suitable device such as instrument 138 shown in FIG. 1 is used to indicate the depth of the drill string 10 in the borehole and hence the recorded information contained in capsule 16 may easily be correlated with the depth recordation provided by the instrument 138. The pressure sensing devices 100 and 102 are spaced apart by a distance L shown in FIG. 2c.

In operation the apparatus shown in the drawings functions as follows:

Considering that the drilling mud 14a is circulating in the borehole 14 while the drill string 10 and drill bit 12 are rotatably penetrating the various earth formations and forming the borehole, the hydrostatic pressure of the drilling fluid against the pressure sensing devices 100 and 102 which are separated by the distance L as illustrated in FIG. 2c is different by virtue of the separation of the pressure sensing devices. In effect, the pressure sensing device 100 senses a lower pressure or total mud weight than the lowermost pressure sensing device 102. This is because the pressure sensing device 102 has a greater hydrostatic head of mud above it. The difference in pressure between sensing devices 100 and 102 is relatively small as compared with the total pressure sensed by either of the pressure sensing devices 100 and 102. However, in the event that during the drilling operation the drill bit 12 penetrates a gas bearing earth formation and gas under pressure emanates from the formation into the column of drilling mud the density of the drilling mud between the two pressure sensing devices 100 and 102 will be noticeably effected. To be specific, the density of the drilling mud between the pressure sensing devices will appear to be less hence, the differential pressure or pressure difference between these pressure sensing devices will ultimately become significant in that the pressure differential therebetween will become less than in the event that gas from the earth formation penetrated did not enter the column of drilling mud between these pressure sensing devices. Signals representative of this differential will be converted by the transducers 130 and 132 and these signals will ultimately be processed by the transducer signals processing circuitry and eventually will be recorded in the recording unit contained in the capsule 16.

While one more or less specific embodiment of the invention has been illustrated and described hereinbefore it is to be understood that the principles of the present invention may be utilized in various ways and that numerous modifications and alterations thereof are contemplated, and that substitution of parts and changes in the construction may be resorted to as expedience, requires it being understood that the embodiment shown in the drawings and described hereinbefore is put forth merely for the purposes of explanation and illustration without intending to limit the scope of the claim to the specific details disclosed.

We claim:

1. Apparatus, for detecting gas bearing earth formations traversed by a mud filled earth borehole as the borehole is being drilled, comprising:

a drill string having a lower end thereof;

first, second and third elongated hollow subs, each of the subs having an upper and lower end, the upper end of the first sub being coupled to the lower end of the drill string, the upper end of the second sub being coupled to the lower end of the first sub and the upper end of the third sub being coupled to the lower end of the second sub;

a drill bit coupled to the lower end of the third sub;

first and second elongated capsules, said first capsule containing logging equipment including a recording unit and associated circuitry, said second capsule containing logging equipment including electrical transducer signals processing circuitry and first and second transducers for converting pressure to electrical signals, said first capsule being located coaxially within the first sub, said second capsule being located coaxially within the second sub;

a first plurality of longitudinal members, each of which is welded longitudinally along an outside surface of the first capsule and to the first sub whereby the first capsule is supported along substantially its entire length within the first sub;

a second plurality of longitudinal members, each of which is welded longitudinally along an outside surface of the second capsule and to the second sub whereby the second capsule is supported along substantially its entire length within the second sub;

a conduit for providing communication between the first and second capsules and the logging equipment contained in said capsules, said conduit having an end thereof which is externally threaded and an opposite end which is threadless, said first capsule having an internally threaded aperture therethrough which receives the externally threaded end of the conduit thereby providing a rigid connection between the conduit and first capsule, said second capsule having threadless aperture therethrough which receives the threadless end of the conduit thereby providing a nonrigid friction fit connection between the conduit and second capsule;

first and second vertically spaced-apart pressure sensing means mounted in a well of said third sub so as to be in contact with the mud which is contained in the borehole between an outside wall of the third sub and a wall of the borehole;

said first and second pressure sensing means being arranged to measure static pressure of the drilling mud at first and second different depths, respectively, between the outside wall of the third sub and the wall of the borehole;

said second capsule having first and second apertures therethrough communicating with said first and second transducers respectively;

first and second fluid-filled conduits, the first fluid-filled conduit communicating the first pressure sensing means with the first tranducer and the second fluid-filled conduit communicating the second pressure sensing means with the second transducer;

whereby differences in static pressures of the mud in the vicinity of the drill bit are converted to electrical signals and processed in the second capsule and are further processed and recorded in the first capsule as the borehole is being drilled.

References Cited

UNITED STATES PATENTS

| | | | |
|---|---|---|---|
| 2,451,604 | 10/1948 | Barnes | 73—438 |
| 2,681,567 | 6/1954 | Widess | 73—151 |
| 3,184,965 | 5/1965 | Noik | 73—152 |

RICHARD C. QUEISSER, Primary Examiner

C. E. SNEE III, Assistant Examiner